US011168436B2

(12) United States Patent
You et al.

(10) Patent No.: US 11,168,436 B2
(45) Date of Patent: Nov. 9, 2021

(54) LAUNDRY TREATING APPARATUS AND METHOD FOR FABRICATING DOOR PROVIDED THEREAT

(71) Applicant: LG ELECTRONICS INC., Seoul (KR)

(72) Inventors: Jungsang You, Seoul (KR); Yongwoo Kwon, Seoul (KR); Minsoo Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/694,846

(22) Filed: Nov. 25, 2019

(65) Prior Publication Data

US 2020/0165767 A1 May 28, 2020

(30) Foreign Application Priority Data

Nov. 27, 2018 (KR) .......................... 10-2018-0148953

(51) Int. Cl.
*D06F 39/14* (2006.01)
*E06B 3/56* (2006.01)
*E06B 5/00* (2006.01)

(52) U.S. Cl.
CPC ................ *D06F 39/14* (2013.01); *E06B 3/56* (2013.01); *E06B 5/00* (2013.01)

(58) Field of Classification Search
CPC . D06F 39/12; D06F 39/14; E06B 3/56; E06B 5/00

(Continued)

(56) References Cited

U.S. PATENT DOCUMENTS

2004/0050117 A1   3/2004  Geyer et al.
2004/0169449 A1*  9/2004  Kim .................... D06F 34/28
                                              312/228

(Continued)

FOREIGN PATENT DOCUMENTS

EP    3 162 944    5/2017
EP    3 162 945    5/2017

(Continued)

OTHER PUBLICATIONS

Korean Office Action dated Jan. 18, 2020 issued in Application No. 10-2018-0148953.

(Continued)

*Primary Examiner* — James O Hansen
(74) *Attorney, Agent, or Firm* — Ked & Associates, LLP

(57) ABSTRACT

The present disclosure provides a method for fabricating a door provided at a laundry treating apparatus, the method including: mounting a front glass to a front glass mounting jig, and mounting a door frame to a door frame mounting jig; applying an adhesive to the door frame; lifting the front glass by absorption, and then mounting onto the door frame; moving the door frame mounting jig to a compression jig; attaching the front glass to the door frame by using the compression jig; separating the door frame mounting jig from the compression jig, and moving to an initial position; and separating an assembly of the front glass attached to the door frame, from the door frame mounting jig, wherein in the applying of the adhesive to the door frame, the adhesive is applied along an adhesive filling groove formed to enclose an opening of the door frame, plural times in a divided manner.

15 Claims, 13 Drawing Sheets

(58) Field of Classification Search
USPC .......................................................... 312/228
See application file for complete search history.

(56) References Cited

U.S. PATENT DOCUMENTS

| | | |
|---|---|---|
| 2012/0055094 A1* | 3/2012 | Iacovoni ........... B32B 17/10036 |
| | | 49/324 |
| 2014/0109622 A1* | 4/2014 | Hwang .................... D06F 39/04 |
| | | 68/16 |
| 2015/0008807 A1* | 1/2015 | Kim ........................ D06F 37/28 |
| | | 312/228 |
| 2017/0121880 A1 | 5/2017 | Cheon et al. |
| 2017/0121890 A1 | 5/2017 | Kwon et al. |
| 2018/0002853 A1 | 1/2018 | Anand et al. |

FOREIGN PATENT DOCUMENTS

| | | |
|---|---|---|
| EP | 3 263 758 | 1/2018 |
| KR | 10-1708354 | 2/2017 |
| KR | 10-1708355 | 2/2017 |
| WO | WO 02/34994 | 5/2002 |

OTHER PUBLICATIONS

European Search Report dated Mar. 30, 2020 issued in Application No. 19211638.2.

\* cited by examiner

LAUNDRY TREATING APPARATUS AND METHOD FOR FABRICATING DOOR PROVIDED THEREAT

CROSS-REFERENCE TO RELATED APPLICATION

Pursuant to 35 U.S.C. § 119(a), this application claims the benefit of the earlier filing date and the right of priority to Korean Patent Application No. 10-2018-0148953, filed in Korea on Nov. 27, 2018, the contents of which is incorporated by reference herein in its entirety.

BACKGROUND

1. Field

The present disclosure relates to a laundry treating apparatus having a door configured to open and close a laundry introduction opening of a body.

2. Background

A laundry treating apparatus includes an apparatus for washing laundry (or clothes), an apparatus for drying laundry, and an apparatus for washing and drying laundry together. In the laundry treating apparatus, washing laundry is a stroke of removing contaminants from the laundry through reaction between water and detergents, and drying laundry is a stroke of removing moisture contained in the laundry by use of a hot air supply device provided in the laundry treating apparatus.

Generally, a laundry treating apparatus includes a body having a laundry introduction opening, and a door configured to open and close the laundry introduction opening. In a case that the door includes a circular front glass, a mechanical object (a pin, a hook, etc.) for guiding a precise attachment position when a door frame is coupled to the front glass, cannot be formed at the front glass due to a characteristic of glass. Further, there is no physical reference point for locating the front glass to a proper position of the door frame, due to a characteristic of the circular shape.

Accordingly, an alignment structure for attaching a circular front glass to a proper position of a circular door frame should be provided, and research on a method to make the alignment structure invisible from the outside of a door is required.

Further, an adhesive is used to attach the front glass to the door frame. According to experimental results, the amount of an adhesive to be applied, and time taken for an adhesive filled in an adhesive gun to harden are variable according to an adhesive application method. Thus, research on a method capable of reducing the amount of an adhesive to be applied, and capable of prolonging time taken for an adhesive filled in an adhesive gun to harden, is ongoing.

BRIEF DESCRIPTION OF THE DRAWINGS

Embodiments will be described in detail with reference to the following drawings in which like reference numerals refer to like elements, and wherein.

DETAILED DESCRIPTION

Hereinafter, a laundry treating apparatus and method for fabricating door provided thereat according to the present disclosure will be described in detail with reference to the accompanying drawings.

A singular representation may include a plural representation unless it represents a definitely different meaning from the context.

The same or equivalent components may be provided with the same or similar reference numbers, even in different embodiments, and description thereof will not be repeated.

In describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 1:
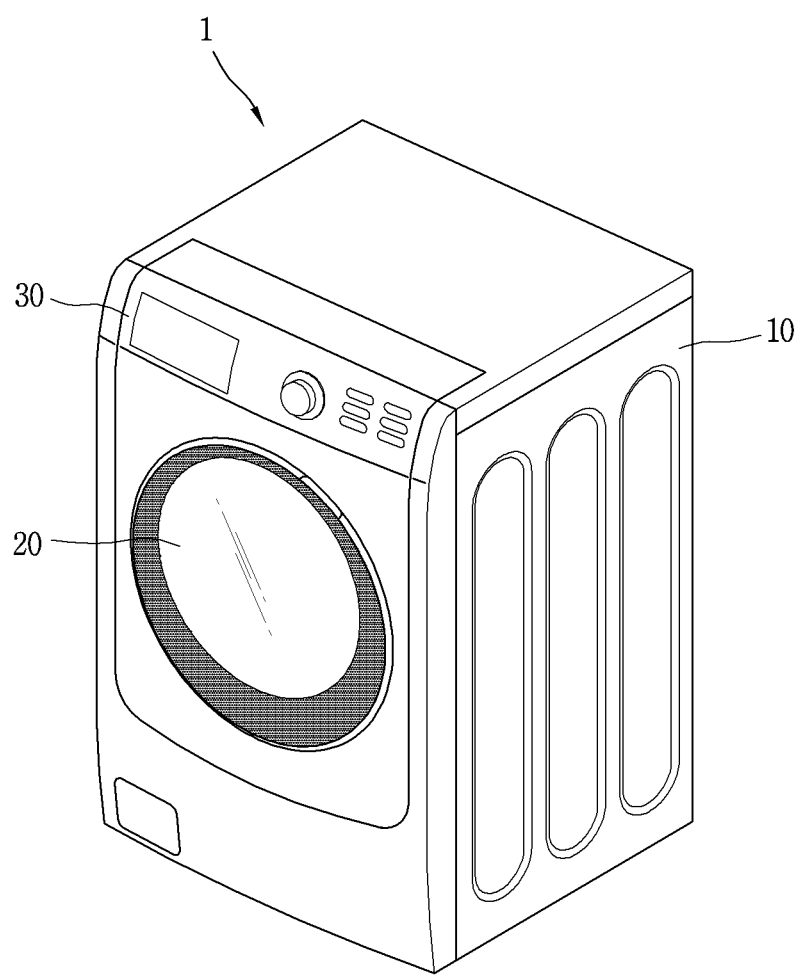
FIG. 1 is a perspective view showing an embodiment of a laundry treating apparatus according to the present disclosure.

FIG. 1 is a perspective view showing an embodiment of a laundry treating apparatus according to the present disclosure.

Referring to FIG. 1, the laundry treating apparatus includes a body 10, a controller 30 and a door 20.

The body 10 forms the appearance of the laundry treating apparatus, and is provided with a laundry introduction opening for introducing laundry therein. In this embodiment, the laundry introduction opening is formed on a front surface of the body 10 having a hexahedron shape. The laundry introduction opening may be formed to have a circular shape.

A laundry accommodation portion, an inner space communicated with the laundry introduction opening, is provided in the body 10. Laundry is accommodated in the laundry accommodation portion through the laundry introduction opening.

As an example, if the laundry treating apparatus is configured as a laundry drying apparatus, the laundry accommodation portion may be configured as a drum rotatably provided in the body 10.

As another example, if the laundry treating apparatus of the present disclosure is configured as an apparatus for washing and drying laundry, the laundry accommodation portion may be configured as a tub provided in the body 10 and configured to store washing water, and a drum rotatably provided in the tub and configured to accommodate laundry therein.

The controller 30 is configured to display visual information related to a stroke performed in the laundry treating apparatus to a user, and to receive a user's manipulation. For this, the controller 30 may be provided with a display for displaying visual information, and a knob or a button for receiving an input. Alternatively, the controller 30 may be configured as a touch screen having the above two functions.

The controller 30 may be provided at the body 10 or the door 20. In the drawing, the controller 30 is positioned at an upper part of the body 10, above the door 20.

The door 20 is configured to be relatively moveable with respect to the body 10 in order to open and close the laundry introduction opening. In the drawing, the door 20 is configured to be relatively moveable with respect to the body 10 through a hinge unit 24.

Hereinafter, the door 20 will be explained in more detail.

Figure 2:
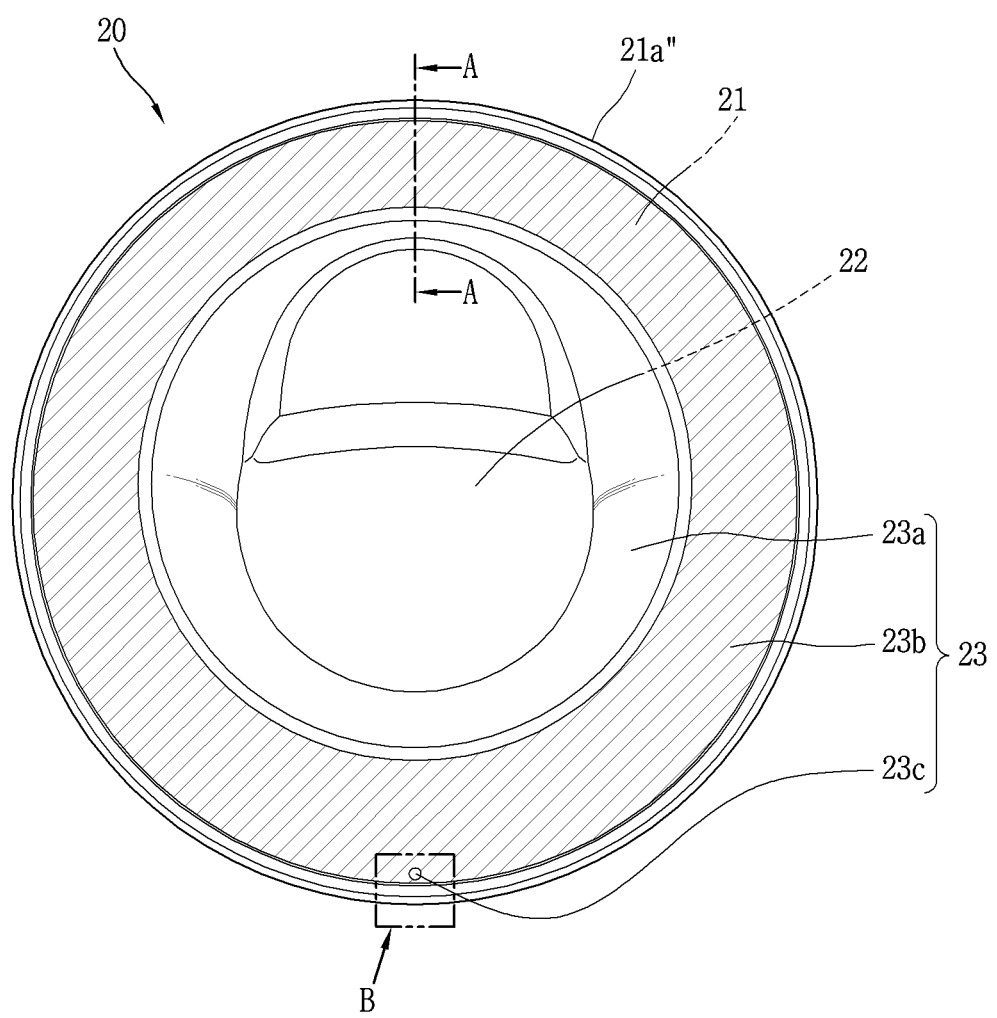
FIG. 2 is a frontal view of a door shown in FIG. 1.
Figure 3:
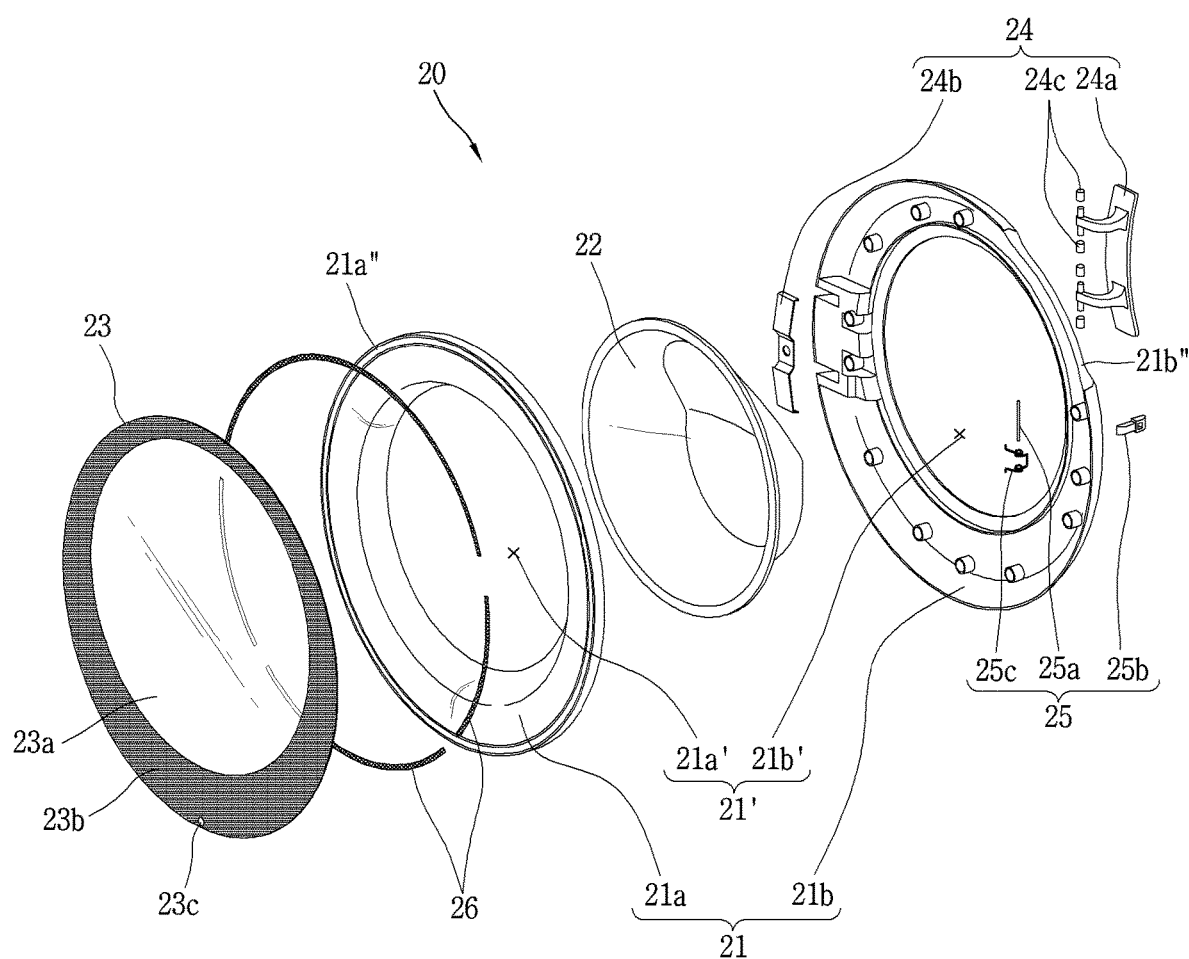
FIG. 3 is a disassembled perspective view of the door shown in FIG. 2.
Figure 4:
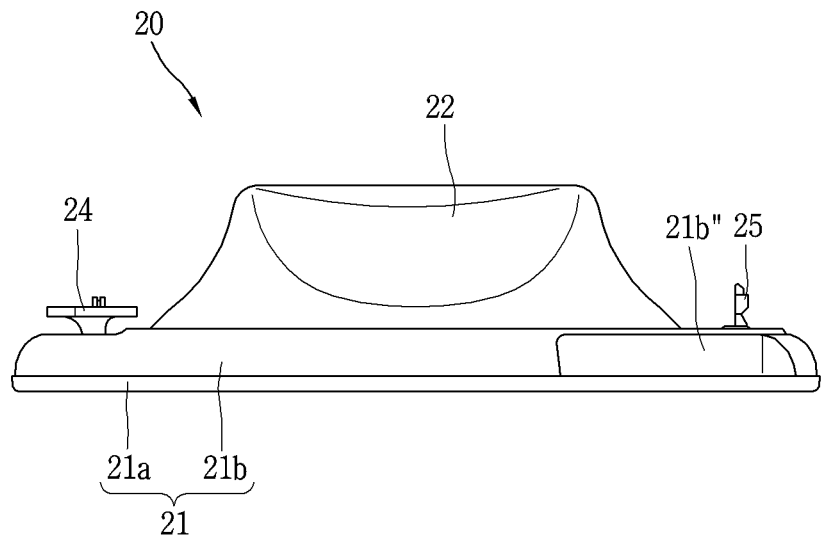
FIG. 4 is a planar view of the door shown in FIG. 2.
Figure 5:
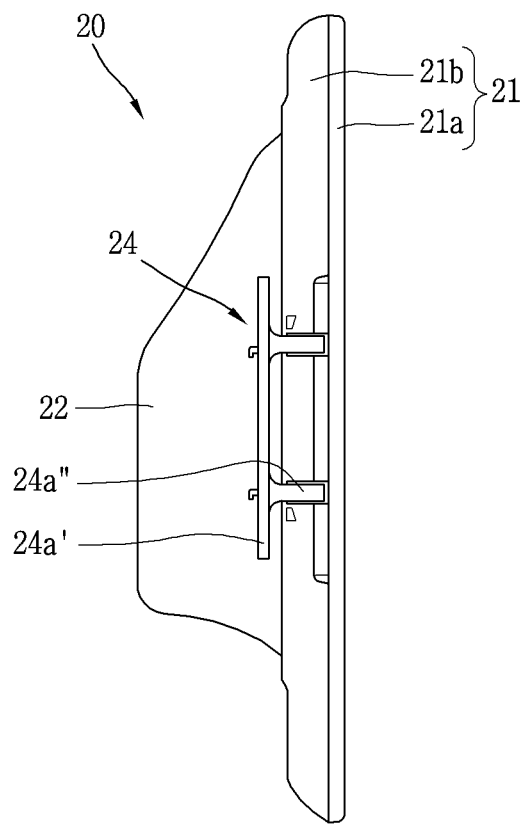
FIG. 5 is a left side surface view of the door shown in FIG. 2.
Figure 6:
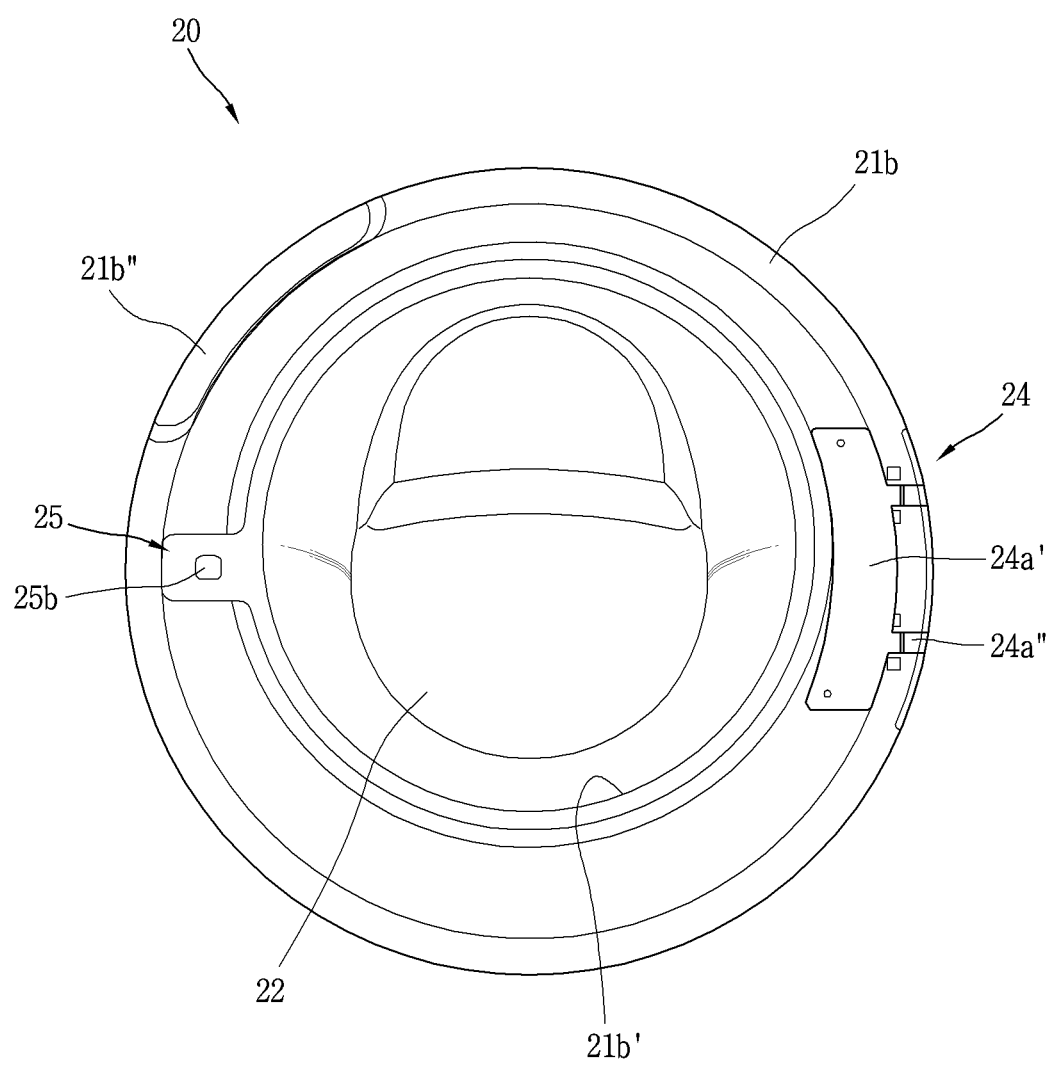
FIG. 6 is a rear view of the door shown in FIG. 2.

FIG. 2 is a frontal view of the door 20 shown in FIG. 1. FIG. 3 is a disassembled perspective view of the door 20 shown in FIG. 2. FIG. 4 is a planar view of the door 20 shown in FIG. 2. FIG. 5 is a left side surface view of the door 20 shown in FIG. 2. And FIG. 6 is a rear view of the door 20 shown in FIG. 2.

Referring to FIGS. 2 to 6, the door 20 includes a door frame 21, a door window 22 and a front glass 23.

The door frame 21 is rotatably coupled to the body 10 by the hinge unit 24. The door frame 21 includes an outer frame 21*a* and an inner frame 21*b*. The outer frame 21*a* and the inner frame 21*b* may be formed of a synthetic resin material (e.g., an ABS material, a PC material, etc.).

For reference, the names of the outer frame 21*a* and the inner frame 21*b* originate from that the outer frame 21*a* is towards the outside of the body 10, and the inner frame 21*b* is towards the inside of the body 10, on the basis of the door frame 21 itself when the door 20 is in a closed state. Without such a distinction, the outer frame 21*a* and the inner frame 21*b* may be referred to as a first frame and a second frame, respectively.

The door frame 21 is provided with an opening 21' which faces the laundry introduction opening in a closed state of the door 20. The opening 21' may be formed to be concentric with the door frame 21. Alternatively, as shown, the opening 21' may be formed to be eccentric from the door frame 21. The opening 21' may be formed to have a circular shape.

The opening 21' may be referred to as a door window hole in that the door window 22 is installed at the opening 21'. For the formation of the opening 21', openings 21*a*', 21*b*' are formed at the outer frame 21*a* and the inner frame 21*b*, respectively.

A recess portion 21*b*" may be formed at the inner frame 21*b*. In a closed state of the door 20, a user may open the door 20 by pulling the door 20 with putting his or her hand into the recess portion 21*b*".

The door window 22 is installed at the door frame 21 in correspondence to the opening 21'. The door window 22 is formed of a synthetic resin material having a transparency, and is arranged to correspond to the laundry introduction opening in a closed state of the door 20.

As aforementioned, the door 20 may be installed so as to be rotatable with respect to the body 10 by the hinge unit 24.

The hinge unit 24 may include a hinge 24*a*, a hinge holder 24*b*, and a bush 24*c*.

The hinge 24*a* is fixed to the body 10, and is rotatably coupled to the door frame 21. The hinge 24*a* may include a base portion 24*a*' fixed to the body 10 in the form of a plate, and a rotation coupling portion 24*a*" protruding from the base portion 24*a*' and rotatably coupled to the door frame 21. The rotation coupling portion 24*a*" may be provided in plurality in number, so as to be spaced apart from each other up and down.

The hinge holder 24*b* is coupled to the door frame 21, and is configured to restrict separation of the rotation coupling portion 24*a*". The hinge holder 24*b* is arranged to cover the rotation coupling portion 24*a*". The hinge holder 24*b* may be coupled to the hinge holder 24*b*.

The bush 24*c* is inserted into a rotation shaft of the rotation coupling portion 24*a*", thereby making the rotation shaft rotate smoothly.

Under a structure that the hinge unit 24 is mounted to one side of the door 20, a locking device 25 for locking or unlocking the door 20 to or from the body 10 is provided at another side of the door 20.

The locking device 25 may include a shaft 25*a*, a door latch 25*b* and an elastic member 25*c*.

The shaft 25*a* is configured to pass through the door latch 25*b*, and is mounted to the door frame 21. The elastic member 25*c* provides an elastic force for restoration when the door latch 25*b* rotates. Accordingly, the door latch 25*b* is configured to rotate and restore to the door frame 21.

The front glass 23 is attached to the door frame 21, thereby forming the appearance of the front surface of the door 20. The front glass 23 is arranged to cover the opening 21' of the door frame 21. In the drawings, the front glass 23 is attached to the outer frame 21*a*.

Figure 7:
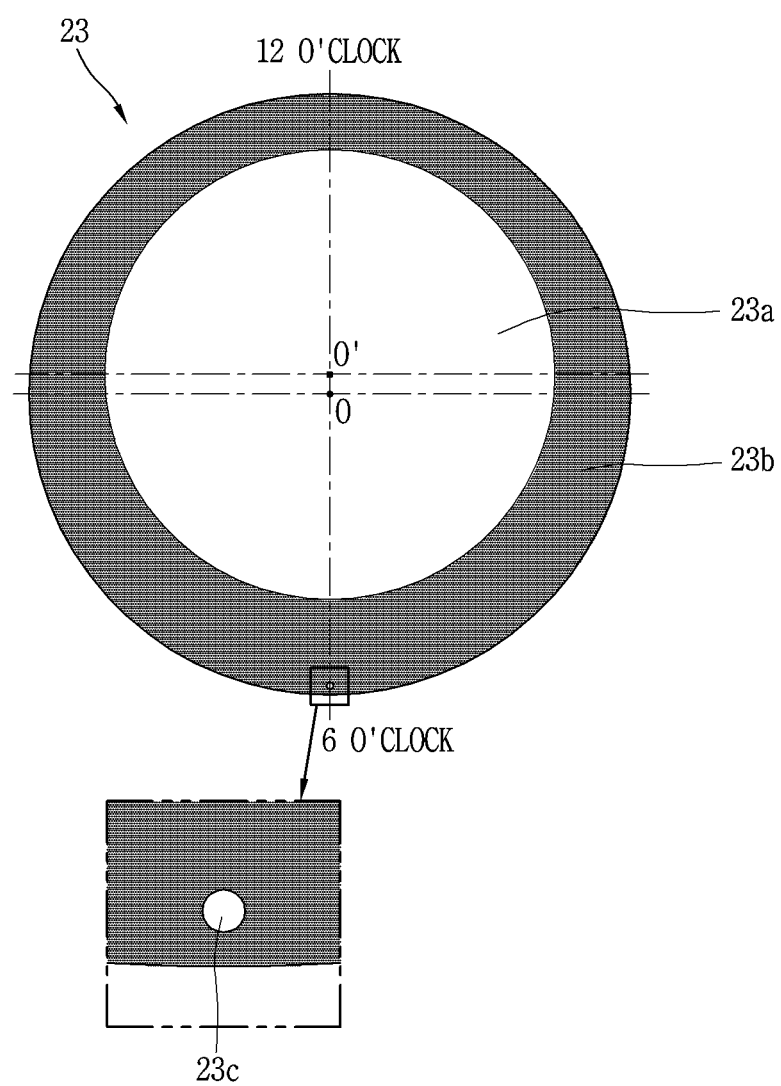
FIG. 7 is a frontal view of a front glass shown in FIG. 3.

FIG. 7 is a frontal view of the front glass 23 shown in FIG. 3. And FIG. 8 shows the front glass 23 of FIG. 7, which is seen from the upper side, the lower side, the left side and the right side, respectively.

Figure 8:
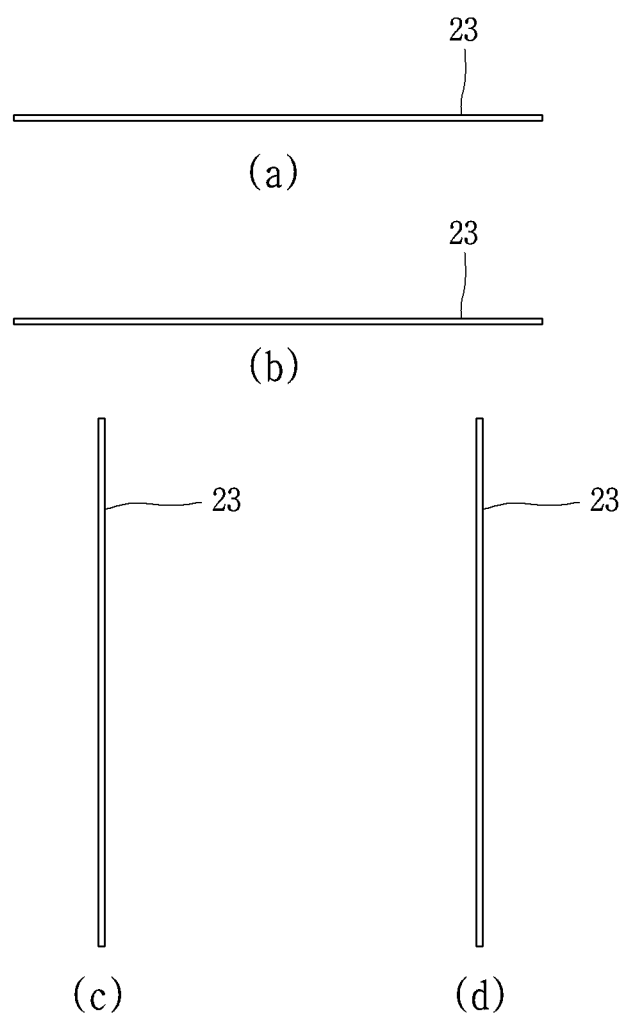
FIG. 8 shows the front glass of FIG. 7, which is seen from the upper side, the lower side, the left side and the right side, respectively.

Referring to FIGS. 7 and 8, the front glass 23 includes a transparent region 23*a* and an opaque region 23*b*. The transparent region 23*a* means a region configured to pass at least part of light therethrough, in order to make the opposite side or the inside visible. Thus, the transparent region 23*a* is a concept to include a semi-transparent region 23*a*.

In a state that the front glass 23 has been attached to the door frame 21, the transparent region 23*a* is arranged to correspond to the opening 21' and the door window 22. Thus, in a closed state of the door 20, a user may view the laundry accommodation portion through the transparent region 23*a*.

If a center of the opening 21' is eccentric from a center of the door frame 21, a center (O') of the transparent region 23*a* may be positioned to be eccentric from a center (O) of the front glass 23.

The center (O') of the transparent region 23*a* is located at a position corresponding to the center of the opening 21'. Here, the corresponding position includes not only a complete consistency of the center, but also the same eccentric direction of the center. That is, the center (O') of the transparent region 23*a* and the center of the opening 21' may be consistent with each other, or an eccentric direction of the transparent region 23*a* may be the same as an eccentric direction of the opening 21'.

In the drawings, the center of the opening 21' is positioned to be eccentric from the center of the door frame 21, towards an upper side (a 12 o'clock direction), and the center (O') of the transparent region 23a is also positioned to be eccentric from the center (O) of the front glass 23, towards an upper side (a 12 o'clock direction). Here, the center (O') of the transparent region 23a may be consistent with the center of the opening 21'.

The opaque region 23b is formed to enclose the transparent region 23a. The opaque region 23b is arranged to cover the remaining part except for the opening 21' of the door frame 21.

The transparent region 23a and the opaque region 23b which encloses the transparent region 23a may be clearly distinguished from each other by the opaque region 23b, in the form of a boundary line.

Alternatively, a boundary between the transparent region 23a and the opaque region 23b may be formed to be indistinct by a halftone technique, for a visual movement from the transparent region 23a to the opaque region 23b. For this, the opaque region 23b includes a plurality of shielding dots formed around the transparent region 23a, and the plurality of shielding dots may be formed to have a density lowered towards the transparent region 23a.

The front glass 23 is formed as a complete circle having a preset radius. The front glass 23 is formed of a glass material. Thus, the front glass 23 is formed such that a front surface and a rear surface thereof are flat. As shown in FIG. 8, the front glass 23 is formed as a disc having a constant thickness, which is not curved when viewed in any directions, i.e., the upper, lower, right and left sides.

Since the front glass 23 formed of a glass material is formed as a complete circle and the front surface and the rear surface thereof are formed to be flat, a sophisticated feeling of the door 20 may be more enhanced than in the conventional door cover formed of a synthetic resin material and formed as an incomplete circle having a convex front surface.

A transparent align mark 23c is formed in the opaque region 23b. The align mark 23c is configured to guide an attachment position of the front glass 23 to the door frame 21. In the drawings, the align mark 23c of a circular shape is formed at a lower side (a 6 o'clock direction) of the front glass 23. However, the present disclosure is not limited to this. The align mark 23c may be formed to have a polygonal shape or a linear shape. The position of the align mark 23c may be variable.

A method for aligning the position of the front glass 23 by using the align mark 23c will be explained later.

The front glass 23 may implement the transparent region 23a, the opaque region 23b and the align mark 23c, by the following layer structure.

For instance, the front glass 23 may include a glass body formed of a glass material having a transparency, and a shielding layer arranged to cover a rear surface of the glass body and forming the opaque region 23b. Here, a part where the shielding layer is not arranged forms the transparent region 23a and the align mark 23c. The shielding layer may be formed by being glass-printed on the rear surface of the glass body.

As another example, the front glass 23 may include a glass body formed of a glass material having a transparency, and a film arranged to cover the rear surface of the glass body. The film may include a transparent part formed to have a transparency in correspondence to the transparent region 23a, an opaque part formed to have a non-transparency in correspondence to the opaque region 23b, and an align part formed to have a transparency in correspondence to the align mark 23c.

As still another example, the front glass 23 may include a glass body formed of a glass material having a transparency, and a film arranged to cover the rear surface of the glass body. This example is differentiated from the above example in that the film includes a first hole formed to correspond to the transparent region 23a, an opaque part formed to have a non-transparency in correspondence to the opaque region 23b, and a second hole formed to correspond to the align mark 23c. That is, there is a difference in that a part of the film, corresponding to the transparent region 23a and the align mark 23c, is formed to have a transparency, or is punched.

Figure 9:
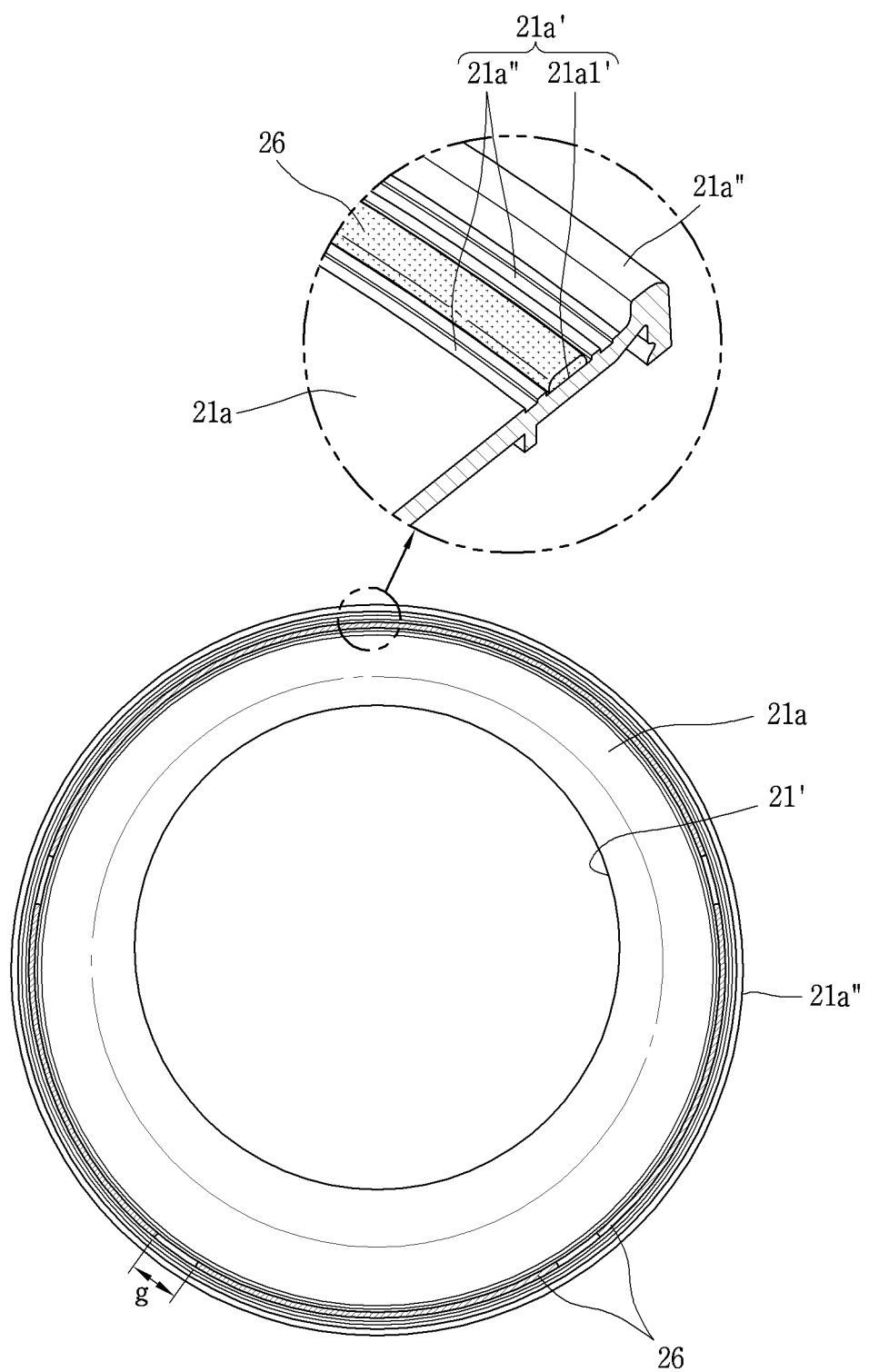
FIG. 9 is a frontal view of a door frame shown in FIG. 3.

FIG. 9 is a frontal view of the door frame 21 shown in FIG. 3. And FIG. 10 is a sectional view taken along line 'A-A' in FIG. 2.

Figure 10:
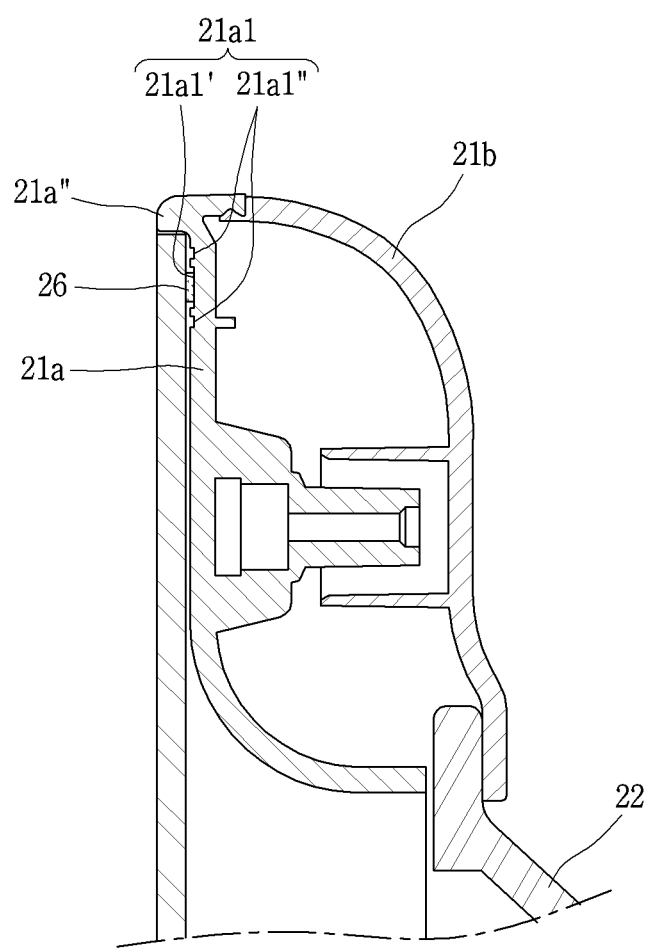
FIG. 10 is a sectional view taken along line 'A-A' in FIG. 2.

Referring to FIGS. 9 and 10, the door frame 21 includes the outer frame 21a and the inner frame 21b.

The front glass 23 is configured to be attached to the front surface of the outer frame 21a. The inner frame 21b is coupled to a rear side of the outer frame 21a. The outer frame 21a and the inner frame 21b may be coupled to each other by a pin-groove coupling, a hook coupling, a screw coupling, a bonding coupling, etc.

A mounting guide 21a" may be formed to protrude along a circumference of the outer frame 21a. The mounting guide 21a" is formed to extend in a ring shape, and forms a space to accommodate the front glass 23 therein.

The mounting guide 21a" is arranged to enclose an outer circumferential surface of the front glass 23. The mounting guide 21a" is formed to have a preset inner diameter. That is, the mounting guide 21a" is formed to have a complete circular shape. The inner diameter of the mounting guide 21a" may correspond to an outer diameter of the front glass 23.

The mounting guide 21a" may protrude by a predetermined height, so as to form the same plane as an upper surface of the front glass 23. Under the configuration, since there is no stepped-pulley between the mounting guide 21a" and the front glass 23, a more simple appearance may be implemented.

An adhesive 26 is arranged between the door frame 21 and the front glass 23, for a coupling therebetween. An adhesive filling groove 21a1 for filling the adhesive 26 is formed at the door frame 21. In the drawings, the adhesive filling groove 21a1 is formed on the front surface of the outer frame 21a.

The adhesive filling groove 21a1 is formed in a ring shape having a preset radius, along a circumference of the mounting guide 21a", so as to enclose the opening 21'. An interval between the mounting guide 21a" and the adhesive filling groove 21a1 may be constantly maintained along the circumference of the mounting guide 21a". That is, a center of the adhesive filling groove 21a1 may correspond to a center of the mounting guide 21a".

As shown, the adhesive filling groove 21a1 may include an adhesive application part 21a1' and adhesive collection parts 21a1".

The adhesive application part 21a1' is a part for applying the adhesive 26, and is formed in a ring shape which encloses the opening 21'. An interval between the mounting guide 21a" and the adhesive application part 21a1' may be constantly maintained along the circumference of the mounting guide 21a". In this case, a center of the adhesive application part 21a1' corresponds to the center of the mounting guide 21a''. Further, since the mounting guide 21a'' is formed to enclose an outer circumference of the front glass 23 having a complete circular shape, the center of the adhesive application part 21a1' also corresponds to a center of the front glass 23.

The adhesive collection parts 21a1'' configured to collect the adhesive 26 which leaks to the inside and the outside of the adhesive application part 21a1' are provided at both sides of the adhesive application part 21a1'. The adhesive collection parts 21a1'' may be formed to extend in parallel along the adhesive application part 21a1', in a spaced state from the adhesive application part 21a1' by a predetermined interval.

That is, the adhesive collection parts 21a1'' includes a first adhesive collection part of a ring shape which encloses the adhesive application part 21a1', and a second adhesive collection part of a ring shape positioned in the adhesive application part 21a1'. That is, the adhesive application part 21a1' is formed to enclose the second adhesive collection part. Here, a center of the first adhesive collection part and a center of the second adhesive collection part correspond to the center of the adhesive application part 21a1'.

The adhesive application part 21a1' is a part where the adhesive 26 is applied, and the adhesive collection parts 21a1'' are provided against an overflow of the adhesive 26. Accordingly, the adhesive collection parts 21a1'' may have a narrower width than the adhesive application part 21a1'.

Under the structure, in the process of coupling the front glass 23 to the outer frame 21a, even if the adhesive 26 filled in the adhesive collection parts 21a1'' leaks, the adhesive 26 may be collected to the adhesive collection parts 21a1'' provided at the inside and the outside of the adhesive application part 21a1'. This may prevent a lowering of the appearance quality due to leakage of the adhesive 26.

Also, under the structure, the adhesive application part 21a1' may be arranged to be close to an edge part of the outer frame 21a, to the maximum. Here, since a corresponding non-coupling part of an edge part of the front glass 23 is minimized, a coupling intensity may be enhanced.

If a door cover formed of a synthetic resin material is used as the front glass 23, a mechanical object (a pin, a hook, etc.) for guiding a precise attachment position when coupling the door cover to the door frame 21 may be formed at the door cover. For example, a pin may be formed on a rear surface of the door cover, and a groove for inserting the pin may be formed at the door frame 21. Then, by a pin-groove coupling, the door cover may be attached to a proper position of the door frame 21.

However, if the front glass 23 formed of a glass material is used, there is a problem that a mechanical object for guiding a precise attachment position when coupling the front glass to the door frame 21 cannot be formed at the front glass 23. Therefore, the front glass 23 should be attached to a proper position of the door frame 21 by another method.

Hereinafter, an apparatus for attaching the front glass 23 to a proper position of the door frame 21, and a method for fabricating the door 20 by using the apparatus will be explained.

Figure 11:
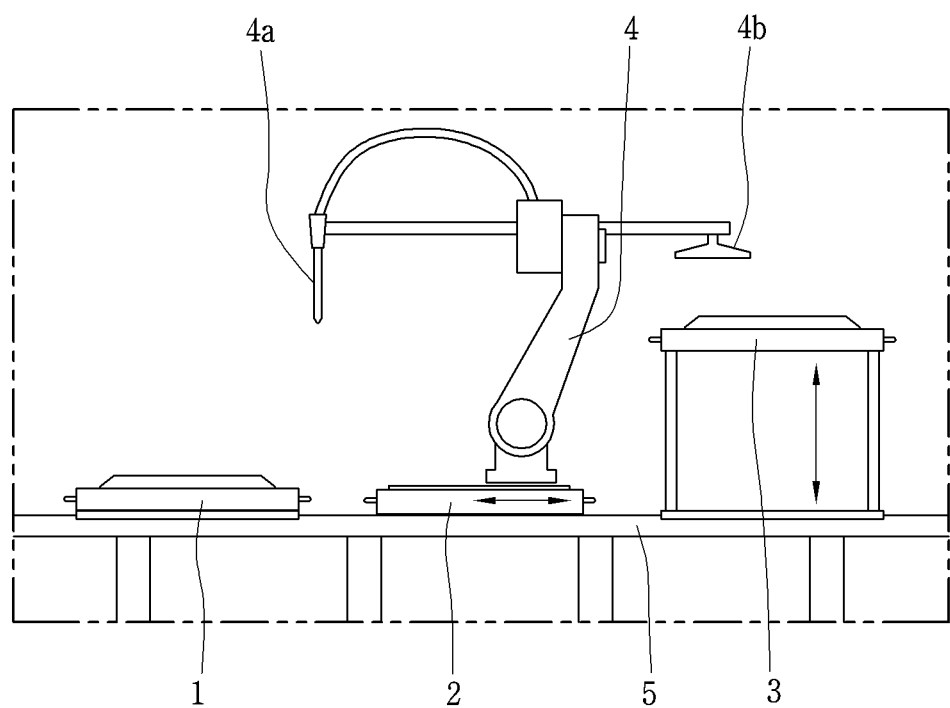
FIG. 11 is a conceptual view schematically showing an apparatus for attaching a front glass shown in FIG. 3 to a proper position of a door frame.

FIG. 11 is a conceptual view schematically showing an apparatus for attaching the front glass 23 shown in FIG. 3 to a proper position of the door frame 21.

Referring to FIG. 11, the apparatus includes a front glass mounting jig 1, a door frame mounting jig 2, a compression jig 3, and a robot arm 4.

The door frame mounting jig 2 is formed to be horizontally moveable through an automated rail 5. The automated rail 5 is formed to extend up to the compression jig 3, so that the door frame mounting jig 2 is moveable up to the compression jig 3.

The robot arm 4 has a movement range for covering the front glass mounting jig 1 and the door frame mounting jig 2 (the initial position). The robot arm 4 is provided with an adhesive gun 4a and an absorbing part 4b.

Hereinafter, a method for fabricating the door 20 by using the apparatus will be explained.

Figure 12:
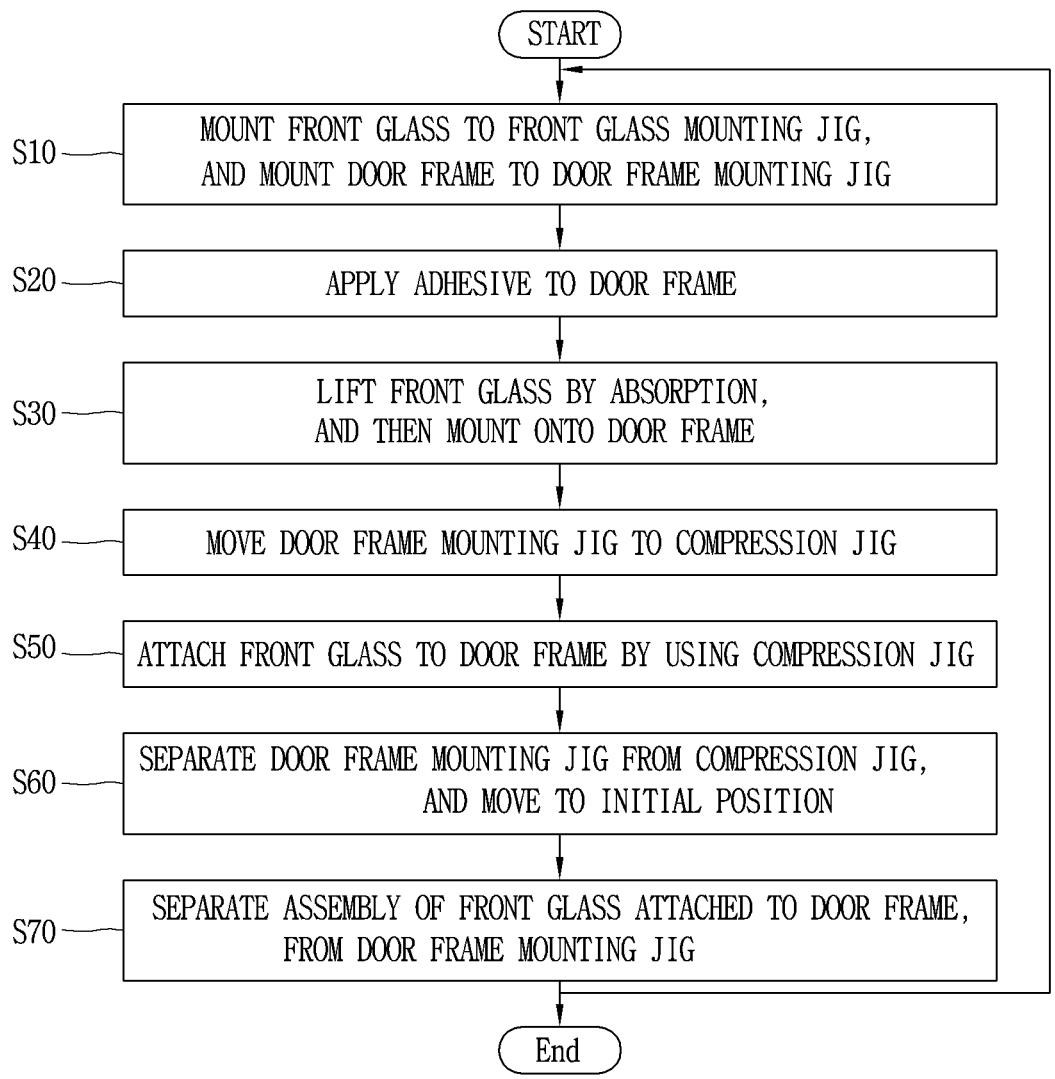
FIG. 12 is a flow chart for explaining an assembly process of a front glass and a door frame, using the apparatus of FIG. 11.

FIG. 12 is a flow chart for explaining an assembly process of the front glass 23 and the door frame 21, using the apparatus of FIG. 11.

Referring to FIG. 12, the front glass 23 is mounted to the front glass mounting jig 2, and the door frame 21 is mounted to the door frame mounting jig 2 (S10). The two processes may be performed regardless of the order.

As can be seen from the fabrication method to be explained later, a position of the front glass 23 mounted to the front glass mounting jig 1 is an attachment position of the front glass 23 to the door frame 21. Thus, the front glass 23 should be mounted to a proper position of the front glass mounting jig 1.

Figure 13:
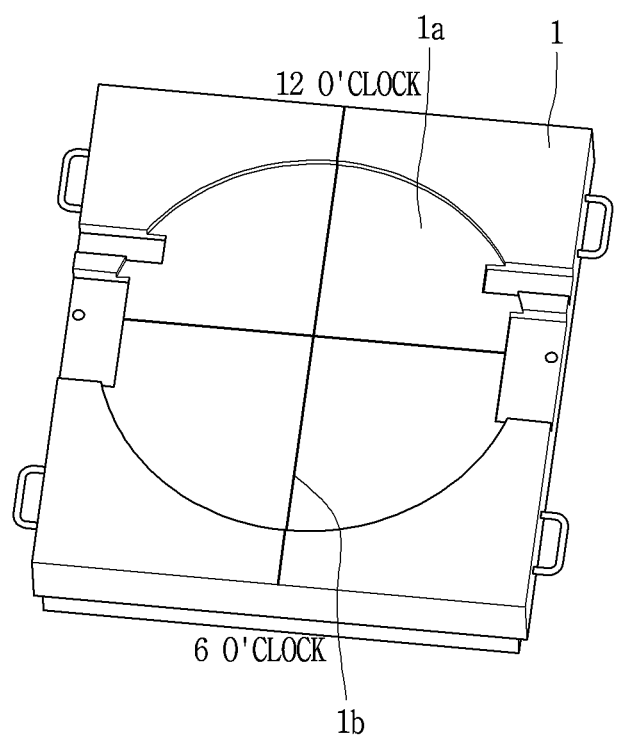
FIG. 13 is a conceptual view of a front glass mounting jig shown in FIG. 11.
Figure 14:
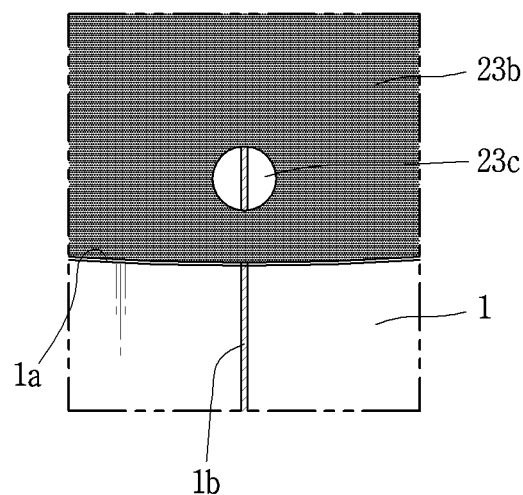
FIG. 14 is a conceptual view for explaining a method for mounting a front glass to a proper position of a front glass mounting jig in FIG. 12.

FIG. 13 is a conceptual view of the front glass mounting jig shown in FIG. 11. And FIG. 14 is a conceptual view for explaining a method for mounting the front glass 23 to a proper position of the front glass mounting jig 1 in FIG. 12.

Referring to FIG. 13, the front glass mounting jig 1 is provided with a front glass mounting portion 1a recessed from an upper surface. The front glass mounting portion 1a is formed to have a size corresponding to the front glass 23. Thus, an inner circumferential surface of the front glass mounting portion 1a may be arranged to face an outer circumferential surface of the front glass 23 with a very small preset interval.

Since the front glass 23 is formed to have a circular shape, the front glass 23 may be rotated in a mounted state to the front glass mounting portion 1a. That is, a position of the front glass 23 mounted to the front glass mounting portion 1a is not limited to a specific position.

In order to guide an attachment position of the front glass 23 to the front glass mounting jig 1, a guide mark 1b is formed at the front glass mounting jig 1, and the transparent align mark 23c is formed in the opaque region 23b of the front glass 23.

In the drawings, the guide mark 1b is formed as a straight line which connects an upper side (a 12 o'clock direction) and a lower side (a 6 o'clock direction) of the front glass 23. However, the present disclosure is not limited to this. That is, the guide mark 1b may be formed to have a polygonal shape, a circular shape, a point, etc., not a line. The position of the guide mark 1b may be changed.

Referring to FIG. 14, once the front glass 23 is positioned so that the guide mark 1b formed at the front glass mounting jig 1 is seen through the align mark 23c of the front glass 23, the front glass 23 is mounted to a proper position of the front glass mounting jig 1.

Referring to FIG. 12 again, next, the adhesive 26 is applied to the door frame 21 mounted to the door frame mounting jig 2 (S20). The application of the adhesive 26 may be performed precisely by the robot arm 4 and the adhesive gun 4a mounted to the robot arm 4. In this case, the robot arm 4 may be configured to move to the door frame mounting jig 2 from an initial position, to apply the adhesive 26 to the door frame 21 by using the adhesive gun 4a, and then to return to the initial position.

In a general case, the adhesive 26 is applied along the adhesive filling groove 21a1 at a time (an entire application method). However, in the present disclosure, the adhesive 26 is applied along the adhesive filling groove 21a1 formed to enclose the opening 21' of the door frame 21, plural times in a divided manner (a divided application method).

The adhesive 26 applied along the adhesive filling groove 21a1 plural times in the divided manner may be distinguished from each other by a predetermined separation interval (g). That is, the adhesive 26 applied each time is arranged with the predetermined separation interval (g). In the drawings, the adhesive 26 is applied at least 4 times.

According to such a divided application method, there is an advantage that the amount of the adhesive 26 to be applied is reduced, even though it takes a more application time than in the aforementioned general entire application method. Further, according to such a divided application method, since the adhesive 26 is supplied to the adhesive gun 4a little by little at the time of each application, time taken to harden the adhesive 26 filled in the adhesive gun 4a can be prolonged more than in the aforementioned general entire application method.

Then, the absorbing part 4b of the robot arm 4 lifts the front glass 23 mounted to the front glass mounting jig 1 in an absorbing manner, and then mounts onto the door frame 21 mounted to the door frame mounting jig 2 (S30). Then, the robot arm 4 may be configured to return to the initial position.

Next, the door frame mounting jig 2 is moved to the compression jig 3 (S40). The door frame mounting jig 2 may be moved to the compression jig 3 through the automated rail 5.

Next, the front glass 23 is attached to the door frame 21 by using the compression jig 3 (S50). In the drawings, the front glass 23 moved to a position below a cover of the compression jig 3 is pressurized by a downward movement of the cover, thereby being attached to the door frame 21.

Next, the door frame mounting jig 2 is separated from the compression jig 3, and is moved to the initial position (S60). In the drawings, the cover is moved to the upper side, the initial position, and the door frame mounting jig 2 returns to the initial position through the automated rail 5.

In the attaching of the front glass 23 to the door frame 21 by using the aforementioned compression jig 3, and the separating of the door frame mounting jig 2 from the compression jig 3 and moving to the initial position, a part of the adhesive 26 filled in the adhesive gun 4a is discarded. This is in order to prevent a blocking of a hole of the adhesive gun 4a for applying the adhesive 26.

More specifically, an assembly process of the front glass 23 and the door frame 21 is repeatedly performed. Here, if the adhesive gun 4a is not used after the adhesive 26 is applied to the adhesive filling groove 21a1, before the application process is repeated, the adhesive 26 may harden to cause a blocking of the hole of the adhesive gun 4a. For prevention of this, a discarding of the part of the adhesive 26 filled in the adhesive gun 4a is added in a process while the adhesive 26 is repeatedly applied to the adhesive filling groove 21a1.

Here, the amount of the adhesive 26 to be discarded is set to be larger than the amount of the adhesive 26 to be applied in the aforementioned applying of the adhesive 26 to the door frame 21.

Then, the assembly of the front glass 23 attached to the door frame 21 is separated from the door frame mounting jig 2 (S70).

The align mark 23c for attaching the front glass 23 to a proper position of the door frame 21 is formed at the front glass 23 which forms the front appearance of the door 20.

Accordingly, if the align mark 23c remains as it is, an aesthetic feeling may be degraded externally. Especially, since the align mark 23c is formed in the opaque region 23b so as to have a transparency, it seems to be more remarkable.

Hereinafter, a structure to make the align mark 23c invisible from the outside of the door 20 will be explained.

Figure 15:
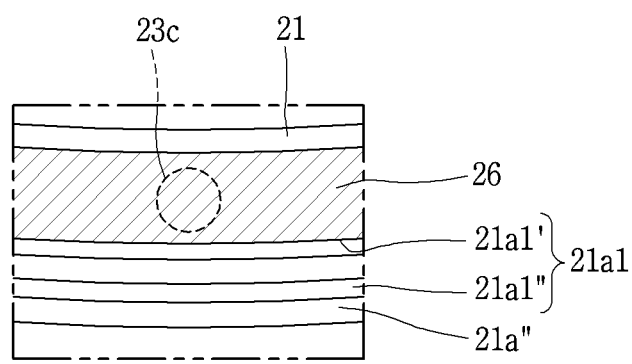
FIG. 15 is an enlarged view of part CB' shown in FIG. 2.

FIG. 15 is an enlarged view of part CB' shown in FIG. 2. In the drawings, for understanding, the front glass 23 is not displayed, but only the align mark 23c is displayed.

Referring to FIG. 15, the adhesive 26 is formed of an opaque material, and is arranged to cover the align mark 23c at a side of a rear surface of the front glass 23. That is, the align mark 23c is positioned to be overlapped on the adhesive 26 applied to the door frame 21. Thus, the align mark 23c is blocked by the adhesive 26.

The adhesive 26 may be formed in the same color as the opaque region 23b (e.g., black). In this case, the align mark 23c may be covered more completely.

As aforementioned, the adhesive filling groove 21a1 includes the adhesive application part 21a1' where the adhesive 26 is applied, and the adhesive collection parts 21a1" configured to collect the adhesive 26 which leaks to both sides of the adhesive application part 21a1'. In a relation between the front glass 23 and the door frame 21, the align mark 23c is arranged to be overlapped with the adhesive application part 21a1'.

Here, in the applying of the adhesive 26 to the door frame 21, even if the adhesive 26 is applied along the adhesive application part 21a1' plural times in a divided manner, it is set that the adhesive 26 should be applied to an overlapped part with the align mark 23c.

Like this, the adhesive 26 is arranged to cover the align mark 23c, and is formed of an opaque material, preferably, in the same color as the opaque region 23b. This may allow the align mark 23c for the alignment not to be discerned easily from the outside of the door 20. Accordingly, the appearance of the door 20 may be enhanced.

Therefore, a first aspect of the present disclosure is to provide a laundry treating apparatus having a front glass formed such that a front surface and a rear surface thereof are flat, the front glass having a complete circular shape.

A second aspect of the present disclosure is to provide an align structure between a front glass and a door frame, at the time of attaching the front glass of a circular shape to the door frame of a circular shape.

A third aspect of the present disclosure is to provide a structure to make the align structure invisible from the outside of a door.

A fourth aspect of the present disclosure is to provide a method capable of minimizing usages of an adhesive for attachment between a front glass and a door frame, and capable of prolonging time taken for the adhesive filled in an adhesive gun to harden.

In order to achieve the first aspect and in accordance with the purpose of this specification, as embodied and broadly described herein, there is provided a laundry treating apparatus, comprising: a body having a laundry introduction opening; and a door configured to open and close the laundry introduction opening, wherein the door includes: a door frame rotatably coupled to the body, and having an opening which faces the laundry introduction opening in a closed state of the door; and a front glass attached to the door frame, forming a front appearance of the door, and including a transparent region corresponding to the opening, and an opaque region formed to enclose the transparent region, and wherein the front glass is formed of a glass material, and is formed as a complete circle which has flat front and rear surfaces and a preset radius.

A mounting guide having a preset inner diameter may be provided at the door frame, the mounting guide protruding to enclose an outer circumferential surface of the front glass, in a ring shape.

An adhesive filling groove for filling an adhesive which attaches the front glass to the door frame, may be formed on a front surface of the door frame. And the adhesive filling groove may be formed in a ring shape having a preset radius, along a circumference of the mounting guide, so as to enclose the opening.

An interval between the mounting guide and the adhesive filling groove may be constantly maintained along the circumference of the mounting guide.

In order to achieve the second aspect and in accordance with the purpose of this specification, as embodied and broadly described herein, there is provided a laundry treating apparatus, comprising: a body having a laundry introduction opening; and a door configured to open and close the laundry introduction opening, wherein the door includes: a door frame rotatably coupled to the body, and having an opening which faces the laundry introduction opening in a closed state of the door; a front glass attached to the door frame, forming a front appearance of the door, and formed to have a circular shape; and an adhesive applied between the door frame and the front glass, and configured to attach the front glass to the door frame, wherein the front glass includes: a transparent region corresponding to the opening; an opaque region formed to enclose the transparent region; and a transparent align mark formed in the opaque region, and configured to guide an attachment position of the front glass to the door frame, and wherein the adhesive is applied (or disposed) to cover the align mark.

The front glass may be formed as a complete circle having a preset radius. And a mounting guide having a preset inner diameter may be provided at the door frame, the mounting guide protruding to enclose an outer circumferential surface of the front glass, in a ring shape.

The front glass may be formed such that a front surface and a rear surface thereof are flat.

A center of the opening may be positioned to be eccentric from a center of the door frame, and a center of the transparent region may be positioned to be eccentric from a center of the front glass.

The center of the transparent region may be located at a position corresponding to the center of the opening.

As an example of the front glass, the front glass may include a glass body formed of a glass material having a transparency; and a shielding layer arranged to cover a rear surface of the glass body and forming the opaque region.

The transparent region and the align mark may be a part where the shielding layer is not arranged.

The shielding layer may be formed by being glass-printed on the rear surface of the glass body.

As another example of the front glass, the front glass may include a glass body formed of a glass material having a transparency; and a film arranged to cover the rear surface of the glass body. And the film may include a transparent part formed to have a transparency in correspondence to the transparent region; an opaque part formed to have a non-transparency in correspondence to the opaque region; and an align part formed to have a transparency in correspondence to the align mark.

As still another example of the front glass, the front glass may include a glass body formed of a glass material having a transparency; and a film arranged to cover the rear surface of the glass body. And the film may include a first hole formed to correspond to the transparent region; an opaque part formed to have a non-transparency in correspondence to the opaque region; and a second hole formed to correspond to the align mark.

Further, in order to achieve the second aspect and in accordance with the purpose of this specification, as embodied and broadly described herein, there is provided a method for fabricating a door provided at a laundry treating apparatus, the method comprising: mounting a front glass to a front glass mounting jig, so that a guide mark formed at the front glass mounting jig is seen through a transparent align mark formed at the front glass; and attaching the front glass to a door frame, wherein the front glass includes a transparent region corresponding to an opening of the door frame; and an opaque region formed to enclose the transparent region, and wherein the align mark is formed in the opaque region.

The front glass may be formed as a complete circle having a preset radius. And a mounting guide having a preset inner diameter may be provided at the door frame, the mounting guide protruding to enclose an outer circumferential surface of the front glass, in a ring shape.

A center of the opening may be positioned to be eccentric from a center of the door frame, and a center of the transparent region may be positioned to be eccentric from a center of the front glass.

The attaching of the front glass to the door frame includes applying an adhesive to the door frame mounted to a door frame mounting jig; lifting the front glass mounted to the front glass mounting jig in an absorbing manner, and then mounting onto the door frame mounted to the door frame mounting jig; moving the door frame mounting jig to a compression jig; attaching the front glass to the door frame by using the compression jig; separating the door frame mounting jig from the compression jig, and moving to an initial position; and separating an assembly of the front glass attached to the door frame from the door frame mounting jig.

In order to achieve the third aspect and in accordance with the purpose of this specification, the adhesive may be formed in the same color as the opaque region.

An adhesive filling groove for filling the adhesive may be formed at the door frame. And the adhesive filling groove may include an adhesive application part configured to provide a space for applying the adhesive, and formed to enclose the opening; and adhesive collection parts formed to extend in parallel along the adhesive application part, at both sides of the adhesive application part, so as to collect the adhesive leaking to the both sides of the adhesive application part.

The align mark may be arranged to be overlapped with the adhesive application part.

In order to achieve the fourth aspect and in accordance with the purpose of this specification, as embodied and broadly described herein, there is provided a method for fabricating a door provided at a laundry treating apparatus, the method comprising: mounting a front glass to a front glass mounting jig, and mounting a door frame to a door frame mounting jig; applying an adhesive to the door frame; lifting the front glass by absorption, and then mounting onto the door frame; moving the door frame mounting jig to a compression jig; attaching the front glass to the door frame by using the compression jig; separating the door frame mounting jig from the compression jig, and moving to an initial position; and separating an assembly of the front glass attached to the door frame, from the door frame mounting jig, wherein in the applying of the adhesive to the door frame, the adhesive is applied along an adhesive filling groove formed to enclose an opening of the door frame, plural times in a divided manner.

The adhesive applied along the adhesive filling groove plural times in the divided manner may be distinguished from each other by a predetermined separation interval.

In the applying of the adhesive to the door frame, the adhesive may be applied at least 4 times.

The adhesive filling groove may include an adhesive application part configured to provide a space for applying the adhesive, and formed to enclose the opening; and adhesive collection parts formed to extend in parallel along the adhesive application part, at both sides of the adhesive application part, so as to collect the adhesive leaking to the both sides of the adhesive application part.

In the attaching of the front glass to the door frame by using the compression jig, and the separating of the door frame mounting jig from the compression jig and moving to the initial position, a part of the adhesive filled in an adhesive gun may be discarded, so as to prevent a blocking of a hole of the adhesive gun which applies the adhesive.

In the attaching of the front glass to the door frame by using the compression jig, and the separating of the door frame mounting jig from the compression jig and moving to the initial position, the amount of the adhesive to be discarded may be set to be larger than the amount of the adhesive to be applied in the applying of the adhesive to the door frame.

In order to achieve the fourth aspect and in accordance with the purpose of this specification, as embodied and broadly described herein, there is provided a laundry treating apparatus, comprising: a body having a laundry introduction opening; and a door configured to open and close the laundry introduction opening, wherein the door includes: a door frame rotatably coupled to the body, having an opening which faces the laundry introduction opening in a closed state of the door, and having an adhesive filling groove formed to enclose the opening; a front glass attached to the door frame to thus form a front appearance of the door; and an adhesive applied to the adhesive filling groove, and configured to attach the front glass to the door frame, wherein the adhesive is applied plural times along the adhesive filling groove with a separation interval.

The adhesive filling groove may include an adhesive application part configured to provide a space for applying the adhesive, and formed to enclose the opening; and adhesive collection parts formed to extend in parallel along the adhesive application part, at both sides of the adhesive application part, so as to collect the adhesive leaking to the both sides of the adhesive application part.

The adhesive application part may be formed in a ring shape having a preset radius.

A center of the adhesive application part may correspond to a center of the front glass.

The front glass may be formed of a glass material, and may be formed as a complete circle having a preset radius.

The front glass may be formed such that a front surface and a rear surface thereof are flat.

The adhesive filling groove may be formed in a ring shape having a preset radius, and a center of the adhesive filling groove may correspond to a center of the front glass.

The front glass may includes a transparent region corresponding to the opening; an opaque region formed to enclose the transparent region; and a transparent align mark formed in the opaque region, and configured to guide an attachment position of the front glass to the door frame. And the adhesive may be applied (or disposed) to cover the align mark.

The adhesive may be formed in the same color as the opaque region.

Firstly, since the front glass formed of a glass material is formed as a complete circle and the front surface and the rear surface thereof are formed to be flat, a sophisticated feeling of the door may be more enhanced than in the conventional door cover formed of a synthetic resin material and formed as an incomplete circle having a convex front surface.

Secondly, when the front glass is mounted to the front glass mounting jig, the guide mark formed at the front glass mounting jig is aligned to be seen through the transparent align mark formed in the opaque region of the front glass. This may allow an alignment between the front glass and the door frame.

Thirdly, the adhesive is arranged to cover the align mark, and is formed in the same color as the opaque region. This may allow the align mark for the alignment not to be discerned easily from the outside of the door. Accordingly, the appearance of the door may be enhanced.

Fourthly, in the applying of the adhesive to the door frame, the adhesive is applied along the adhesive application part formed to enclose the opening of the door frame, plural times in a divided manner. This may minimize usages of the adhesive for attachment between the front glass and the door frame, and may prolong time taken for the adhesive filled in the adhesive gun to harden.

Further, in the attaching of the front glass to the door frame by using the compression jig, and the separating of the door frame mounting jig from the compression jig and moving to the initial position, a part of the adhesive filled in the adhesive gun is discarded. This may prevent a blocking of a hole of the adhesive gun for applying the adhesive.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry treating apparatus, comprising:
a body having a first opening; and
a door configured to open and close the first opening, wherein the door comprises:
    a door frame to be rotatably coupled to the body, the door frame having a second opening that faces the first opening when the door is in a closed state, and the door frame having a groove formed to enclose the opening;
    a front glass to attach to the door frame, the front glass having a front facing surface with an edge surface that is perpendicular to the front facing surface; and
    a plurality of adhesive layers provided along the groove, and configured to attach the front glass to the door frame,
    wherein the door frame comprises:
        an outer frame disposed toward an outside of the body, wherein the front glass is attached to a front surface of the outer frame;
        an inner frame disposed toward an inside of the body, the inner frame coupled to a rear side of the outer frame; and
        a mounting guide protruding from an outer circumference of the outer frame and the mounting guide abutting the edge surface of the front glass in order to enclose an edge surface area of the front glass,
    wherein a separation interval is between adjacent adhesive layers, and the plurality of adhesive layers disposed at an inside of the mounting guide.

2. The laundry treating apparatus of claim 1, wherein the groove comprises:
an adhesive application area configured for applying the adhesive layers, and the adhesive application area is to enclose the opening; and
adhesive collection grooves to extend in parallel along both sides of the adhesive application area, so as to collect adhesive leaking to the sides of the adhesive application area.

3. The laundry treating apparatus of claim 2, wherein the adhesive application area is provided in a ring shape having a fixed radius.

4. The laundry treating apparatus of claim 3, wherein a center of the adhesive application area corresponds to a center of the front glass.

5. The laundry treating apparatus of claim 1, wherein the front glass has a circular circumference having a fixed radius.

6. The laundry treating apparatus of claim 5, wherein a front surface of the front glass is flat, and a rear surface of the front glass is flat.

7. The laundry treating apparatus of claim 5, wherein the groove is formed in a ring shape having a fixed radius, and a center of the adhesive filling groove corresponds to a center of the front glass.

8. The laundry treating apparatus of claim 1, wherein the front glass comprises:
a transparent region corresponding to the opening of the door frame;
an opaque region formed to enclose the transparent region; and
a transparent alignment window formed in the opaque region, and configured to align the front glass to the door frame when the front glass is to be attached to the door frame, and
wherein adhesive is to cover the transparent alignment window.

9. The laundry treating apparatus of claim 8, wherein the adhesive is formed in a same color as the opaque region.

10. A laundry treating apparatus, comprising:
a body having a first opening; and
a door configured to open and close the first opening, wherein the door comprises:
    a door frame to be rotatably coupled to the body, the door frame having a second opening that faces the first opening when the door is in a closed state, and the door frame having a groove to surround a portion of the opening;

a front glass to attach to the door frame, the front glass having a front facing surface with an edge surface that is perpendicular to the front facing surface; and a plurality of adhesive structures applied at the groove, and configured to attach the front glass to the door frame, wherein the door frame comprises:
- an outer frame disposed toward an outside of the body, wherein the front glass is attached to a front surface of the outer frame;
- an inner frame disposed toward an inside of the body, the inner frame coupled to a rear side of the outer frame; and
- a mounting guide protruding from an outer circumference of the outer frame and the mounting guide abutting the edge surface of the front glass in order to enclose an edge surface area of the front glass, wherein a non-adhesive space is provided on the groove between two of the adhesive structures, and the plurality of adhesive structures disposed at an inside of the mounting guide.

11. The laundry treating apparatus of claim 10, wherein the groove comprises:

an adhesive application area configured for applying the adhesive structures, and the adhesive application area is to enclose the opening; and adhesive collection grooves to extend in parallel along both sides of the adhesive application area, so as to collect adhesive leaking to the sides of the adhesive application area.

12. The laundry treating apparatus of claim 11, wherein the adhesive application area is provided in a ring shape having a fixed radius.

13. The laundry treating apparatus of claim 12, wherein a center of the adhesive application area corresponds to a center of the front glass.

14. The laundry treating apparatus of claim 10, wherein the front glass has a circular circumference having a fixed radius.

15. The laundry treating apparatus of claim 10, wherein the front glass comprises:

a transparent region corresponding to the opening of the door frame;

an opaque region formed to surround the transparent region; and a transparent alignment window formed in the opaque region, and configured to align the front glass to the door frame.

* * * * *